Oct. 13, 1931.    S. NEWALL    1,827,602
MEASURING APPARATUS
Filed Dec. 5, 1928    4 Sheets-Sheet 1

INVENTOR
SIDNEY NEWALL
by his attorneys
Howson and Howson

Oct. 13, 1931.  S. NEWALL  1,827,602
MEASURING APPARATUS
Filed Dec. 5, 1928  4 Sheets-Sheet 2

INVENTOR
SIDNEY NEWALL
by his attorneys
Howson and Howson

Oct. 13, 1931.    S. NEWALL    1,827,602
MEASURING APPARATUS
Filed Dec. 5, 1928    4 Sheets-Sheet 3
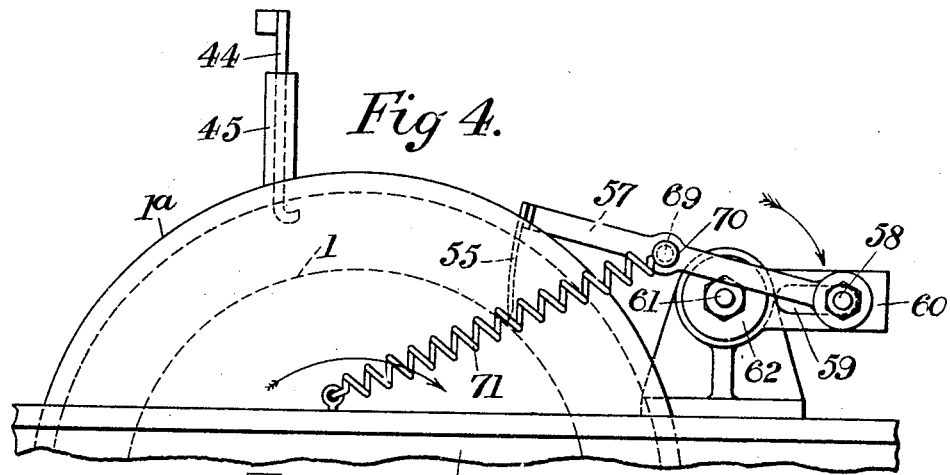
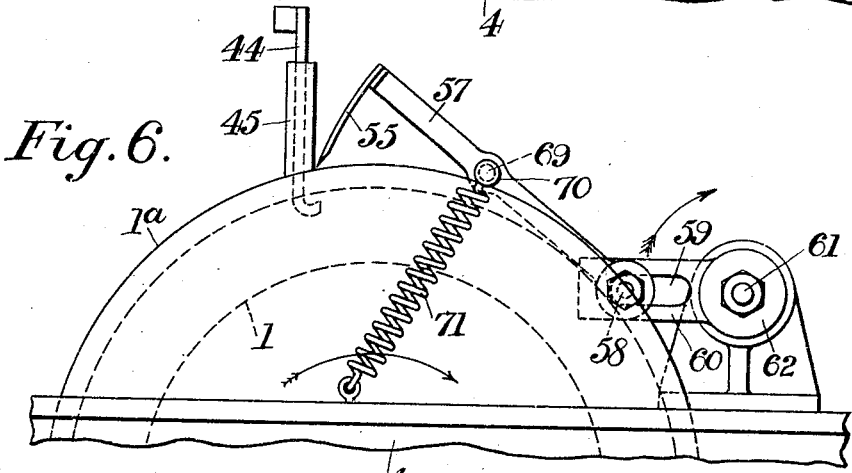
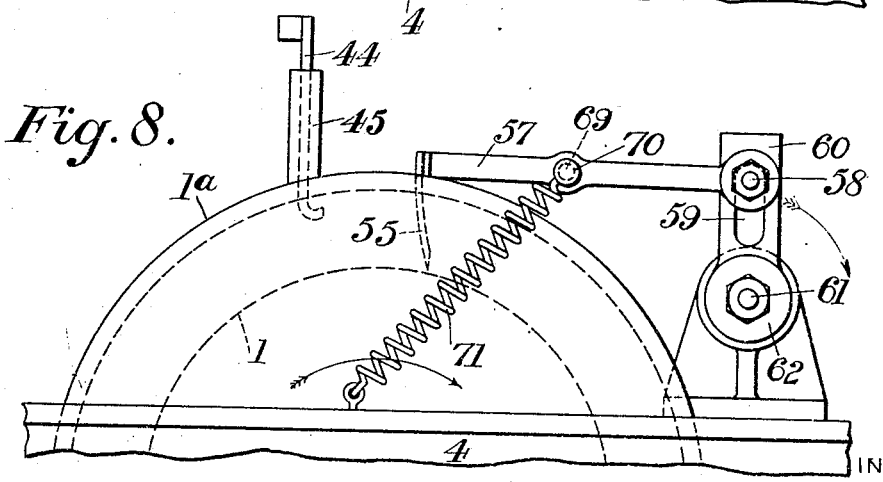
INVENTOR
SIDNEY NEWALL
by his attorneys
Howson and Howson Oct. 13, 1931.  S. NEWALL  1,827,602
MEASURING APPARATUS
Filed Dec. 5, 1928    4 Sheets-Sheet 4

INVENTOR
SIDNEY NEWALL
by his attorneys
Howson and Howson

Patented Oct. 13, 1931

1,827,602

UNITED STATES PATENT OFFICE

SIDNEY NEWALL, OF BRANTWOOD, MOORE, ENGLAND, ASSIGNOR TO JOSEPH CROSFIELD & SONS LIMITED, OF WARRINGTON, ENGLAND, A BRITISH COMPANY

MEASURING APPARATUS

Application filed December 5, 1928, Serial No. 324,015, and in Great Britain February 9, 1928.

This invention relates to apparatus for conveying powdered, or granular, material from bulk and delivering it in measured quantities into a container and has for its object to provide an improved and simplified construction of apparatus whereby the containers fed thereto are more accurately and rapidly filled with a predetermined quantity of material.

According to this invention the apparatus comprises a constantly rotatable flanged drum onto the periphery of which the material to be delivered into the containers is conveyed, preferably through a hopper, by any suitable means from a source of supply. The material delivered onto the periphery of the rotating drum is carried thereby past a gate whch determines the thickness of the layer of material thereafter conveyed by the said drum towards the container to be charged. When the drum with the aforesaid layer of material thereon has turned a predetermined amount a scraper moving at a greater speed than the peripheral speed of the said drum operates to scrape the said material off the drum from which it passes into a container placed in position to receive it. The aforesaid gate and the scraper are preferably capable of adjustment so that any desired predetermined quantity of material can be scraped off the drum into the container at each operation of the said scraper. The hopper which supplies the material from bulk to the rotatable drum may, if desired, be provided with a device for agitating the material therein and a device for pressing the said material onto the periphery of the said drum.

One embodiment of the invention is shown in the accompanying drawings in which

Figure 1 is a side elevation view thereof, while

Figures 4 to 8 are detail views of the drum and scraper mechanism used in the apparatus shown in Figures 1 to 3 and described in detail hereinafter. These figures show in succession the various positions which the scraper takes as it is moved by its operating mechanism.

Figure 1:
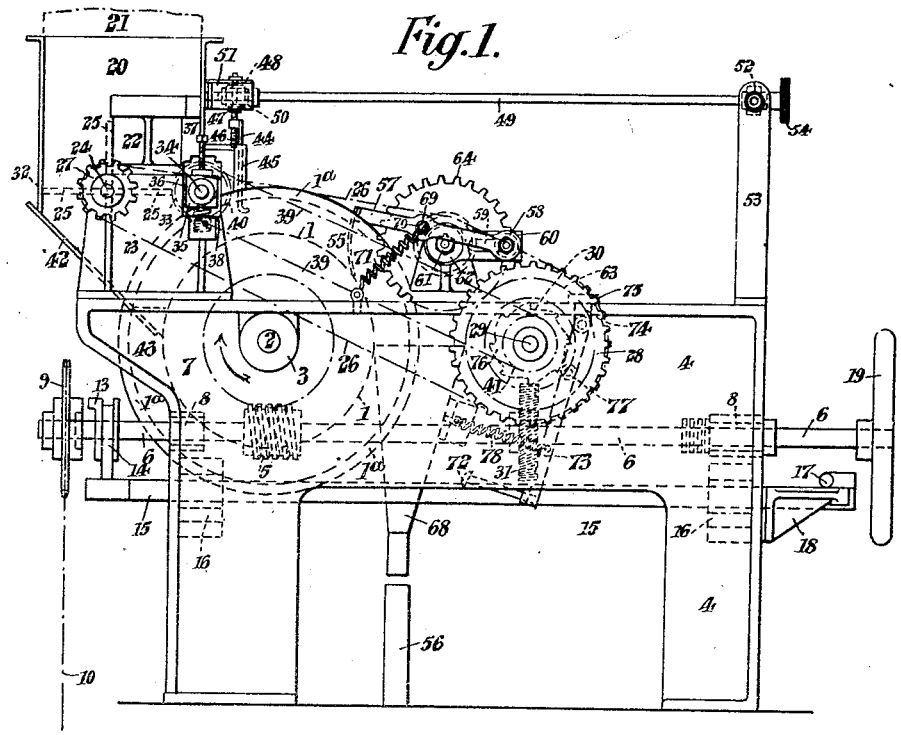
Figure 3:
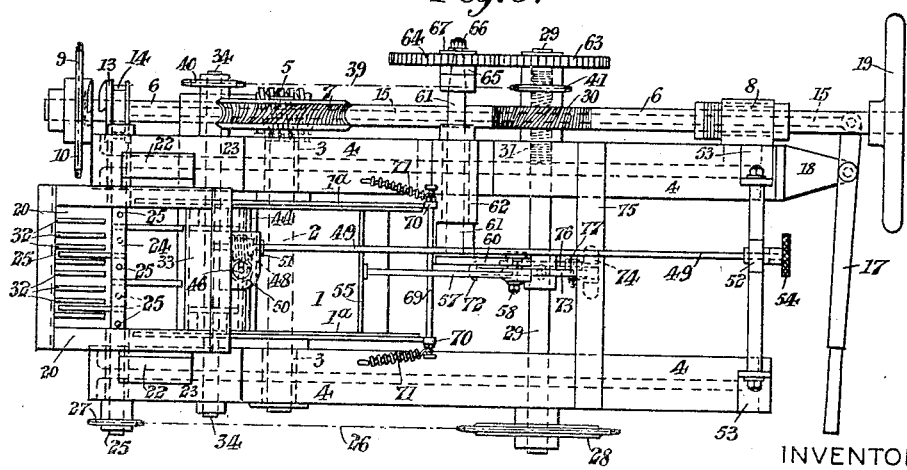
Figure 3 is a plan view.
Figure 2:
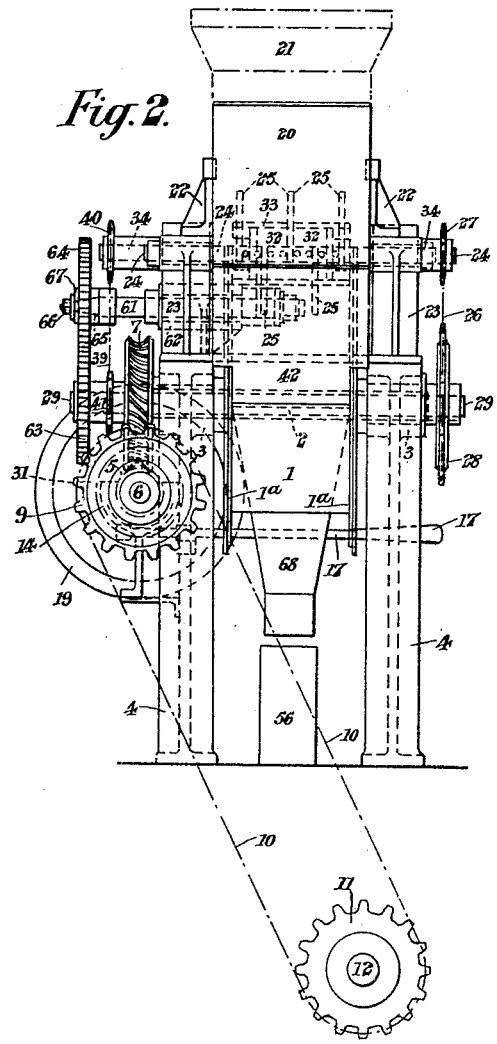
Figure 2 is an end elevation view.

My invention is intended for use with apparatus which conveys bags, cardboard, or tin, containers thereto, or with apparatus which makes and then conveys the bags, cardboard, or tin, containers thereto, the operation of the respective apparatus being so timed relatively the one to the other that a bag, cardboard, or tin, container (hereinafter referred to as the container) is in position to be filled with material at the proper time.

The apparatus shown comprises a flanged drum 1 secured to a shaft 2 rotatable in bearings 3 on side frames 4. The drum shaft 2 is rotated by a worm 5 secured to a driving shaft 6 which engages with a worm wheel 7 secured to the said drum shaft. The driving shaft 6 is mounted in bearings 8 on one of the aforesaid side frames 4 and may have rotary motion transmitted thereto from the apparatus operating in conjunction therewith by any suitable means such as will cause the said driving shaft to rotate at the proper speed to charge the containers with material as they are in succession conveyed to the charging position. This is shown as being effected by a sprocket wheel 9 rotatably mounted on the shaft 6 to which rotary motion is transmitted by a chain 10 passed over a sprocket wheel 11 secured to a shaft 12 appertaining to an apparatus operating in conjunction therewith. The sprocket wheel 9 constitutes one member of a clutch the other member 13 of which is slidable on but rotatable with the shaft 6 so that by sliding the said member 13 on the said shaft it can be moved into or out of engagement with the rotating clutch member 9 as desired. Any suitable means may be provided for sliding the clutch member 13 on the shaft 6: this is shown as being effected by a clutch shifter 14 secured to a bar 15 slidable in bearings 16 on one of the said frames 4 and adapted to be actuated by a hand lever 17 pivoted to a bracket 18 secured to the said side frame. The teeth of the respective clutch members are so spaced that they will only engage when one clutch member is turned to a predetermined position relatively to the other clutch member. A hand-wheel 19 is shown secured to the shaft 6 for turning it by hand when required. In a suitable position over the flanged drum 1 is a hopper 20 which feeds the material to the periphery of the said drum from an overhead bin 21, the said hopper being held in position by brackets 22 bolted to bearing brackets 23 which rest upon and are secured to the side frames 4 at the rear of the machine. Rotatable within the hopper 20 is a spindle 24 having blades 25 thereon which act as agitators. The spindle 24 has a sprocket wheel 27 secured thereon and is mounted in the bearing brackets 23. The rotary motion is imparted to the spindle by a chain 26 which passes over a sprocket wheel 27 and over a sprocket wheel 28 secured to a spindle 29 which is driven from the driving shaft 6 by skew wheels 30 and 31 secured to the spindle 29 and the driving shaft 6 respectively. The spindle 29 is in fact an intermediate drive shaft since all of the moving parts of the device derive their motion from it through the various means as herein described.

Within the hopper 20 and to the rear side thereof are secured a number of small bars 32 between which the agitator blades 25 pass and which co-act with the said blades to stir up the material in the said hopper.

In order to compress the material slightly which has dropped from the agitator on to the periphery of the drum, a roller 33 is secured on a shaft 34 located in front of the agitator blades. As the drum rotates the material is carried forward and is compressed between the drum and the roller 33.

To regulate the amount of compression the distance between the roller and drum may be varied by means which will now be described. The roller shaft 34 is rotatably mounted in bushings 35 which are vertically adjustable in vertical guideways 36 cut in the bearing brackets 23. Between the bottom of the guideway and the bottom of the bushings are coil springs 38 which support the bushings. At the top of the guideways are screws 37 threaded through rigid supports and having their ends pressing against the tops of the bushings. By turning the screws down the bushings and hence the roller 33 is moved closer to the periphery of the drum.

Rotation of the roller 33 is caused by the intermediate drive shaft 29 rotating a sprocket wheel 41, secured on the shaft 29 and carrying a chain 39 which passes around another sprocket 40 secured to the roller shaft 34.

At the rear of the hopper 20 is a plate 42 provided with a pad 43, preferably of hard wood, or other suitable material, which is held against the drum 1 and prevents the material passing between the said plate and the drum. If desired, means may be provided for adjusting the plate 42 to compensate for wear of the pad 43.

From the foregoing it will be apparent that the drum 1, during its rotation, carries forward a layer of the material on its upper periphery. In order to regulate the thickness of this layer a vertically adjustable plate 44 (constituting the beforementioned gate) is mounted on the hopper 20 in front of the compressing roller 33, the plate extending across the full width of the drum 1 between the flanges 1a thereof and has its lower edge straight, or as shown in Figure 1, curled forward in the form of a lip. By raising, or lowering, the plate 44 relatively to the periphery of the drum 1 a layer of compressed material of predetermined thickness can be retained on the periphery of the said drum. The plate 44 is slidably mounted in a guide piece 45 secured to the bracket 22 and it is caused to be raised or lowered therein by a screw 46 which engages with an internally screw-threaded boss 47 at the upper end of the said plate. Rotation of the screw may be effected by a worm 48, secured to a rod 49, which engages with a worm-wheel 50 secured to the said screw. The worm 48 and the worm wheel 50 and also the inner end of the rod 49 are preferably supported by and enclosed in a casing 51 secured to the hopper 20, and the said rod preferably extends as shown, to the forward end of the frame 4 where its outer end is rotatably supported in a bearing 52 secured to brackets 53 on the side frames 4. Instead of the worm 48 and worm wheel 50, bevel wheels, or any other desired toothed gearing, may be employed. The outer end of the rod 49 is shown provided with a milled head 54 for rotating the said rod.

As the drum 1 rotates, at a predetermined speed, the layer of material is carried forward and at the proper time is scraped off the periphery of the said drum by a reciprocating scraper into a container 56 placed in position below the machine to receive the material.

The scraper consists of a plate 55 secured on one end of a rod 57. The other end of the rod is connected to a crank 60 by a pin and slot connection 58, 59 in order that the degree of movement of the scraper may be varied so that a greater or less quantity of material may be scraped off. The crank 60 is secured on a spindle 61 which is pivoted in a bearing 62 mounted in a bracket secured to the frame 4 and is rotated by the intermediate drive shaft 29 through intermeshing toothed wheels 63, 64 which are secured to the intermediate drive shaft and the scraper crank spindle 61 respectively. In order that the movements of the scraper may be timed properly with the movement of the drum 1, one end of the scraper crank spindle 61 is tapered and the wheel 64 is adjustably secured thereon by nut 66. By loosening the nut the wheel 64 can be rotated freely to the proper position and then it can be secured there by tightening up the nut.

Figure 5:
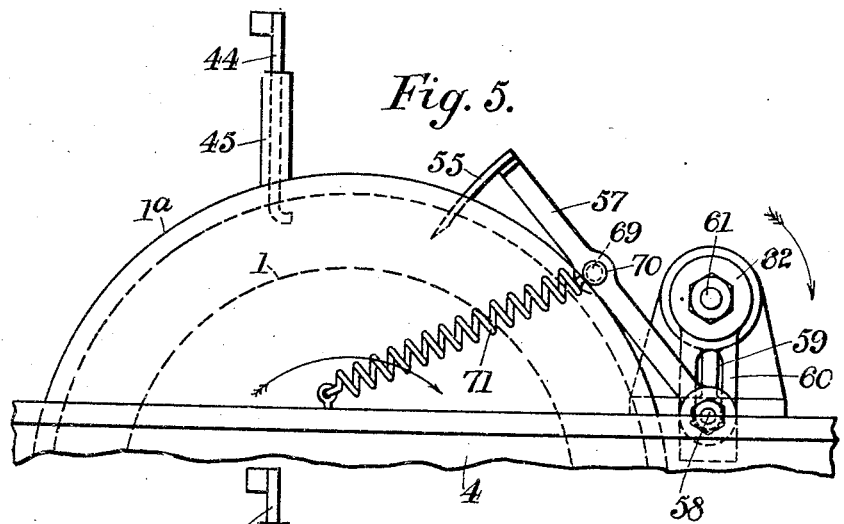
Figure 7:
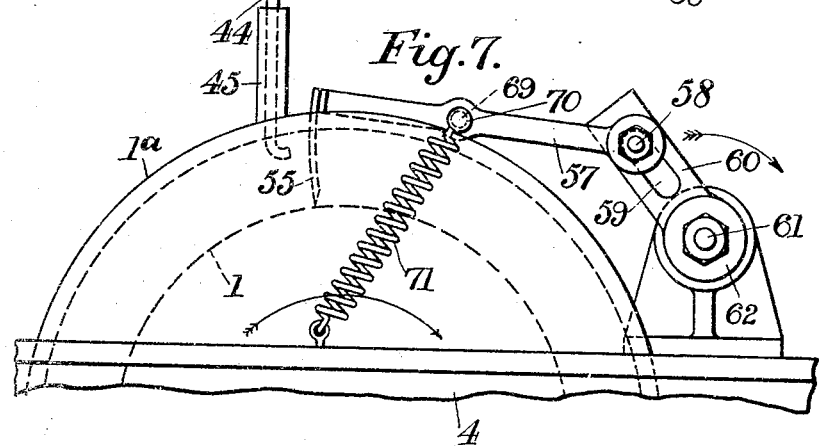

In order to urge the scraper plate 55 toward the surface of the drum a tension spring 71 is provided having one end anchored to the frame 4 while its other end is connected to the middle of the scraper arm 57. At the middle of the scraper arm a cross bar 69 is located. This bar is of sufficient length to straddle the flanges of the drum 1 and has near its ends rollers 70 which at times ride upon the flanges of the drum as shown in Figures 5, 6, 7. Referring to Figures 4–8 it will be noted that as crank 60 rotates clockwise from the end-of-stroke position shown in Figure 4, the spring 71 forces the rollers 70 against the periphery of the drum as the crank end of the scraper arm 57 is lowered. Thus the upper end of the scraper arm is raised lifting the scraper plate 55 off the drum. As the rotation of the crank continues, the crank end of the scraper arm is elevated and moved to the right while the scraper plate is urged toward the drum by spring 71. In this way the rollers 70 ride a short distance around the flanges of the drum in counter clockwise direction. This movement continues until the crank and scraper arm are in alignment. Then the scraper is ready to start its movement to scrape the material from the drum, but from the aligned position to the position of the crank arm shown in Figure 7, very little scraping is done since the movement of the scraper is practically perpendicular to the drum surface. Figure 8 shows the actual scraping movement well on its way.

The material scraped off falls from the drum into a funnel 68 located adjacent the drum and secured beneath the scraper, between the side frames 4. The funnel delivers the material to the container 56 placed below it.

If desired means may be provided for vibrating the funnel 68 to prevent powdered material, which may be of a moist, or clinging, nature, adhering to its inner surfaces. This may be effected by providing a hammer 72 on the end of an oscillatory arm 73 pivotally connected, at its other end, to a bracket 74 secured to the underside of a cross-bar 75 supported on the side frames 4. The oscillatory arm 73 is actuated by a ratchet wheel 76 secured to the intermediate drive shaft 29 with which a roller, or its equivalent 77 on the said arm is held in engagement by a spring 78 attached at one end to the said arm and at its other end to the outer wall of the funnel 68. The teeth of the ratchet wheel 76 successively act, by the rotation of the said wheel, to move the arm 73 with the hammer 72 thereon from the funnel 68 and the spring 78 acts, as each ratchet tooth passes the roller, or its equivalent, 77 to pull the said arm towards the said funnel in such manner that the hammer 72 strikes the wall of the funnel with sufficient force to vibrate the funnel and thereby prevents any tendency for the material to adhere thereto.

The width, or the diameter, of the drum is adapted to suit the quantity and the particular kind of material to be measured. If the capacity of the containers be such that two, or more, charging operations are necessary to fill the said containers, the apparatus could, if desired, be provided with two, or more, drums each provided with devices as hereinbefore described. In this arrangement a predetermined quantity of material would be scraped at the proper times from each drum and delivered into a container as it is moved into position beneath each drum in succession until the required predetermined total quantity has been deposited therein.

What I claim is:—

1. In an apparatus for measuring and conveying finely divided material from bulk, a rotating flanged drum, means delivering material to said drum, means to scrape off material from said drum said scraping means comprising, a rod, and a crank, a scraper plate secured on one end of said rod, the other end of said rod being secured to said crank, said crank causing said rod to reciprocate and to scrape a quantity of material from said drum at each reciprocation.

2. In an apparatus for measuring and conveying finely divided material from bulk, a rotating flanged drum, means delivering material to said drum, means to scrape off material from said drum said scraping means comprising a rod, and a crank, a scraper plate secured on one end of said rod, the other end of said rod being secured to said crank, said crank causing said rod to reciprocate and to scrape a quantity of material from said drum at each reciprocation, and means to regulate the magnitude of said reciprocations comprising a pin and slot connection between said crank and rod.

3. In an apparatus for measuring and conveying finely divided material from bulk, a rotating flanged drum, means delivering material to said drum, means to scrape off material from said drum, said scraping means comprising a rod, and a crank, a scraper plate secured on one end of said rod, the other end of said rod being secured to said crank, said crank causing said rod to reciprocate, a cross bar passing through the mid portion of said rod and adapted to be supported, at certain times, on the flanges of said drum, a spring urging said scraper toward said drum, said parts all cooperating for the purpose described.

4. In an apparatus for measuring and conveying finely divided material from bulk, a rotating flanged drum, means delivering material to said drum, means to scrape off material from said drum, said scraping means comprising a rod, a scraper plate secured on one end of said rod, a crank connected with the other end of said rod causing said rod to reciprocate, said scraper plate resting on said drum during forward reciprocation and remaining off the drum during rearward reciprocation, the speed of said forward reciprocation exceeding the peripheral speed of the drum, whereby a quantity of material is scraped off on each forward reciprocation.

In testimony whereof I have signed my name to this specification.

SIDNEY NEWALL.